June 2, 1942.    O. L. DIRRIG    2,284,950

ENCLOSED SELF-LOCKING CAGELESS ROLLER BEARING

Filed June 18, 1941

Inventor
Ollie L. Dirrig
By Lyon & Lyon
Attorneys

Patented June 2, 1942

2,284,950

UNITED STATES PATENT OFFICE 2,284,950

ENCLOSED SELF-LOCKING CAGELESS ROLLER BEARING

Ollie L. Dirrig, Los Angeles, Calif.

Application June 18, 1941, Serial No. 398,612

5 Claims. (Cl. 308—214)

This invention relates to an anti-friction bearing of the roller type. In a common type of roller bearing the rollers are of slightly tapered or conical form, and on their inner sides roll on a conical bearing member while rolling at their outer sides on the outer conical face of the bearing. In such a bearing it is absolutely essential to maintain the rollers in perfect alignment, and in order to accomplish this, such bearings are practically always provided with a cage consisting of a ring or rings in which the ends of the rollers are held in such a way as to maintain each roller on an axis of rotation that is fixed with respect to the cage or ring carrying the rollers. In such bearings, if either the inner or outer bearing member becomes injured in such a way that it must be replaced, it becomes practically necessary to replace the entire bearing. This is true because a bearing of this kind will not operate satisfactorily unless all of the parts of the bearing have become worn to substantially the same extent. Nevertheless, there is danger that in making repairs to bearings of this kind, an old roller cage with its rollers may be used in a bearing in which either the outer or inner bearing member or both of the same, have been substituted for the original parts.

One of the objects of this invention is to overcome this difficulty, and to provide a roller bearing in which the bearing members and the rollers are so correlated as to enable the outer and inner bearing members to maintain the proper alignment of the rollers. In this way I avoid the necessity for the use of a cage to carry the rollers, and I also avoid the disadvantage that is inherent in the use of a cage, arising from the fact that the bearings for the ends of the rollers in the cage, eventually wear to some extent, and this wear enables the rollers to cock or tilt out of line so that although the cage performs its aligning function for the rollers admirably to begin with, it will not perform its function properly if any considerable amount of wear has taken place at the end bearings for the rollers.

A further object of the invention is to provide a roller bearing of this type, which is so constructed that the parts of the bearing can be readily assembled, and when once assembled will be automatically locked in their operating relation, that is to say, one of my objects is to produce an enclosed self-locking, cageless, roller bearing.

Further objects of the invention will appear hereinafter.

The invention consists in the novel parts and combination of parts to be described hereinafter, all of which contribute to produce an efficient enclosed self-locking, cageless, roller bearing.

A preferred embodiment of the invention is described in the following specification, while the broad scope of the invention is pointed out in the appended claims.

In the drawing:

Fig. 1 is a longitudinal section through a bearing embodying my invention, passing through the axis of the bearing and illustrating a pair of diametrically opposite rollers set in the position that they should have when the bearing is about to be assembled. The rollers are also shown in cross-section.

Fig. 2 is a view similar to Fig. 1, but showing the same bearing illustrated in Fig. 1 after a relative rotation of the inner and outer bearing members has taken place, and in which the rollers will have become shifted into different oriented positions on their own axes, enabling some of them to project beyond the periphery of the inner bearing member and into the portion of the roller raceway that is located in the outer bearing member, thereby locking the inner and the outer bearing members against a relative shifting movement longitudinally of the axis of the bearing.

Figure 1:
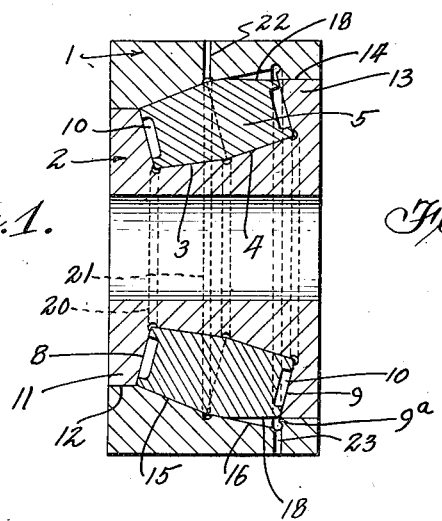
Figure 2:
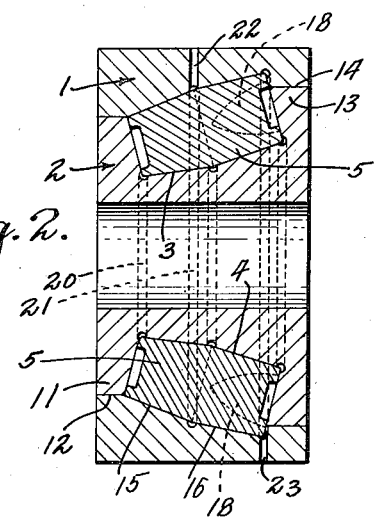
Figure 3:
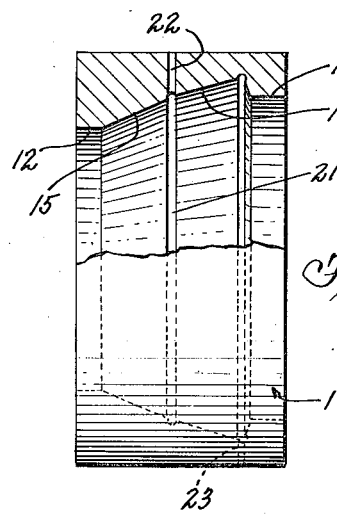
Fig. 3 is a partial side elevation and partial section of the outer bearing member or cup of the bearing.
Figure 4:
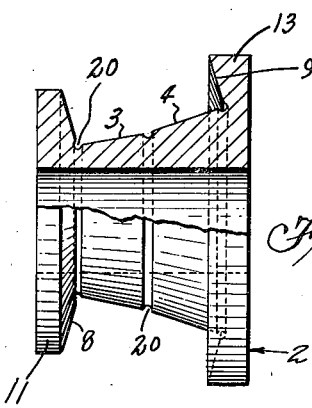
Fig. 4 is a view of the same kind as Fig. 3, but showing the inner bearing member or main cone member of the bearing.

In practicing the invention, I provide a plurality of freely movable unconnected rollers; that is to say, the rollers are not carried in a cage, nor are they connected pivotally to any part. They are mounted in the bearing for planetary movement around the axis of the bearing, but are loose and free except as confined by the inner and outer bearing members. These rollers have their maximum diameter at an intermediate point on their length, and each roller tapers on a conical taper toward each end from this intermediate point. In other words, the cones are preferably constructed as two cones integral with each other at their large ends, and the axes of the rollers are disposed at an angle to the axis of the bearing. Each bearing also includes an inner bearing member having two conical faces, the elements of one of which form a dihedral angle of revolution about the axis of the bearing to fit against the sides of the rollers, and the bearing includes an outer annular bearing member that has conical faces, the elements of one of which form a dihedral angle of revolution about the axis of the bearings to fit against the rollers on their outer sides. These dihedral angles of revolution operate to maintain the alignment of the rollers in their planetary movement around the axis of the bearing.

Referring more particularly to the parts, 1 indicates the annular outer bearing or cup of the bearing, and 2 indicates the inner or main cone member of the bearing. The body portion of the cone member 2 is formed with a conical face 3, and a second conical face 4. The elements of these two faces are disposed at different angles to the axis of the bearing, and as illustrated, the elements of the conical portion or face 4, form a greater angle with the axis of the bearing than the angle at the face 3. In other words, the conical face 4 has larger diameters at its ends than the cone 3.

These conical faces 3 and 4 intersect to form a dihedral angle of revolution about the axis of the bearing, and form as it were, a wide angled gutter or circumferential groove passing around the outer side of the inner bearing member.

The relation of these cones 3 and 4 to each other, determines the form of the conical portions of the rollers that are to complete the bearing.

Figure 5:
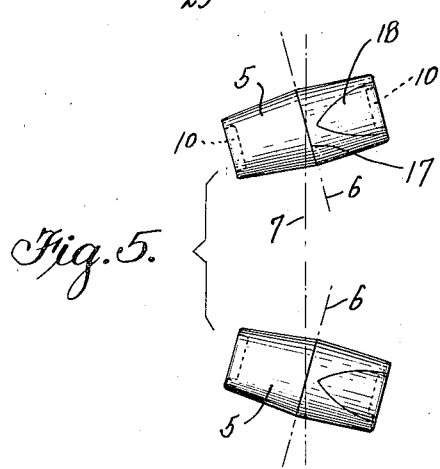
Fig. 5 is a diagrammatic view illustrating the relation of the rollers to the medial plane of the bearing, and also illustrating the "flats" or relief faces that I prefer to use on the outer ends of the rollers, to facilitate the aligning of the cup of the bearing with the inner, or cone, member when the bearing is being assembled.

The bearing carries a plurality of rollers 5, and these rollers have the form of two truncated cones with their large ends integrally connected together. If desired, the rollers may be made of two separate sections with their butt ends together. Although it is not essential to have the point of maximum diameter of the roller at the middle of the roller, I have illustrated the rollers as constructed in this way in the drawing. In other words, each roller has a plane of maximum diameter indicated by the line 6, and from this intermediate point on the length of the roller, the roller tapers toward each end. In the present instance, this taper is preferably somewhat less for the end that is farther from the axis of the bearing. Fig. 5 illustrates the relative position of two diametrically opposite rollers of a bearing. When the rollers are in place, two such diametrically opposite rollers would be disposed in a position such as that illustrated, so that the intermediate planes of the rollers indicated by the line 6, would form an acute angle with the medial plane of the bearing indicated by the line 7.

The inner bearing member 2 is also formed with conical faces 8 and 9, which abut against the ends of the rollers, and the ends of the rollers are preferably formed with a slight recess 10 disposed centrally on each end. These end faces 8 and 9 cooperate with a circumferential gutter or groove formed by the dihedral angle between the cone faces 3 and 4.

The space partially enclosed by the end faces 8 and 9, and the two faces 3 and 4, constitutes the inner portion of the raceway for the rollers. On the inner face of the outer bearing member 1 a raceway is formed, but in such a way that the rollers do not project equally into the outer raceway as compared with the inner raceway. In order to accomplish this, the end of the bearing member 2 adjacent to the conical face 3 is turned to form a cylindrical head 11, the periphery of which fits into a cylindrical bore 12 formed at the adjacent end of the outer bearing member 1. The other end of the inner bearing member 2 is turned to form a head 13 of larger diameter to fit a bore 14 of larger diameter formed on the other end of the outer bearing member 1.

Figure 6:
Fig. 6 is a diagrammatic outline perspective of one of the rollers, and particularly illustrating the way in which the ends of the rollers are mutilated or cut away so as to enable them to cooperate with the inner and outer bearing members in assembling the bearings.

The outer bearing member is formed with two conical bearing faces 15 and 16. The elements of these faces are disposed at different angles with respect to the axis of the bearing, so as to correspond with the bearing faces 3 and 4, and these faces 15 and 16 form a dihedral angle of revolution which is equal to the dihedral angle of revolution formed at the intersection of the conical faces 3 and 4. In other words, the bearing faces 15 and 16 are such as to fit against the outer sides of the rollers 5, and form an outside guide groove and raceway for the outer portions of the rollers. The diameter of the head 11 is such that its cylindrical face is in line with the outer portions of the inner end faces of the rollers; that is to say, the end faces that are located nearest to the axis of the bearing. The diameter of the large head 13, however, is such that it is not located in line with the outer edges of the outer end faces of the rollers, but is of a less diameter than this, so that if the rollers 5 had the same cross-section throughout their entire periphery at their outer ends, they would project up into the interior of the outer bearing member 1 in the annular recess that is formed between the conical face 16 and the conical end face 9a that is in alignment with the conical face 9 already referred to. Such a construction, however, would make it impossible for the bearing member 1 to be shifted into position over the inner bearing member 2, and would necessitate the outer bearing member being made in sections connected together. In accordance with my invention, however, I form the remote or outer ends of the rollers 5 that are located farther or farthest from the axis of the bearing, with a cutaway portion that may be said to originate at a point 17 near the medial plane 6 of the roller, and becomes gradually deeper toward the adjacent end of the roller. This forms a relief face 18 that I now refer to as a "flat," although it need not be actually a flat surface. This surface can be struck on a radius, the center of which would be located at the axis of the bearing resulting in an arc-shaped end line 19 for the "flat" (see Fig. 6). By placing all of the rollers into position with these "flats" disposed radially outward on the bearing, the rollers will not project outwardly beyond the location of the bore 14, and this, of course, will enable the outer bearing member 1 to be shifted longitudinally into its aligning position as indicated in Fig. 1. This is the procedure in assembling the bearing. After the outer bearing member is in place, of course, after a relative rotation of the inner and outer bearing members has occurred, the rollers will become oriented around their own axes of revolution, and portions of the rollers will then project up into the angle between the conical face 16 and the conical face 9a. In this way the conical face 9a operates as a shoulder to prevent the outer bearing member 1 from being removed. In this way a closed bearing results. Of course, in practice, any desired means may be employed for making a dust-proof joint at the bores 12 and 14 of the bearing, but if these bores are fitted nicely to the diameter of the heads 11 and 13, dust-proof sealing means would hardly be necessary.

In the operation of this bearing at high speed, the conical face 9 assists in resisting the action of the centrifugal force on the rollers. This function is of some importance because it assists in holding the rollers against any tendency to shift longitudinally along their axes under the action of the centrifugal force. The face 9 and also the face 8 at the other end of the bearing, also cooperate to enable the bearing to take end thrust.

Although for the purposes of illustration, I have represented two rollers 5 as though located diametrically opposite to each other, it should be understood that in practice, the bearing does not necessarily have an even number of rollers. Any number of rollers may be employed, but preferably an uneven number. This has some advantages in a bearing that is located with its axis horizontal, but would usually be immaterial in a bearing whose axis was vertical.

At the intersection of the cone faces 3 and 4, and also at the remote ends of these cone faces, I prefer to provide circumferential oil grooves 20. These grooves not only operate as oil grooves, but obviate the bringing together of two faces at a sharp angle. This is generally to be avoided in machine shop practice. In addition to this, similar circumferential grooves 21 may be provided on the inner face of the cup bearing 1. The bearing can be lubricated by providing a single oil hole 22 at an elevated point in the wall of the cup 1, into which the lubricant can be dropped when desired. Due to the general construction of the bearing, the lubricant, of course, will be carried along the faces of the rollers throughout all portions of the raceways for the rollers. In order to prevent the bearing from gumming up on its interior and to enable it to be flushed when desired, the under side of the cup 1 may be provided with a drain or drip hole 23. If such a bearing is in use continuously through a long period of time, it could be flushed from time to time, and supplied with fresh lubricant. This bearing will evidently operate as a thrust bearing, as well as a regular centering and supporting bearing.

Many other embodiments of the invention may be resorted to without departing from the spirit of the invention.

What I claim is:

1. In a high-speed bearing, the combination of a plurality of freely movable unconnected rollers, each of said rollers having its maximum diameter at an intermediate point on its length, and tapering on a conical taper toward each end from said intermediate point, the axes of said rollers disposed at an angle to the axis of the bearing, an inner bearing member having two conical faces, the elements of one of said conical faces forming a dihedral angle of revolution about the axis of the bearing, to fit the sides of said rollers, and an outer annular bearing member, having conical faces, the elements of one of said last-named conical faces forming a dihedral angle of revolution about the axis of the bearing, to fit against the rollers on their outer sides, said dihedral angles of revolution operating to maintain the alignment of said rollers; said rollers having bearing faces at their outer ends, and said outer bearing member having a conical face engaging the same and capable of resisting end thrust of the rollers under action of the centrifugal force acting upon the rollers, and enabling the bearing to take end thrust exerted toward said last-named conical face.

2. In a high-speed bearing, the combination of a plurality of freely movable unconnected rollers, each of said rollers having its maximum diameter at an intermediate point on its length, and tapering on a conical taper toward each end from said intermediate point, the axes of said rollers disposed at an angle to the axis of the bearing, an inner bearing member having two conical faces, the elements of one of said conical faces forming a dihedral angle of revolution about the axis of the bearing, to fit the sides of said rollers, and an outer annular bearing member, having conical faces, the elements of one of said last-named conical faces forming a dihedral angle of revolution about the axis of the bearing, to fit against the rollers on their outer sides, said bearing members having a conical end face abutting the ends of the rollers at their ends that are remote from the axis of the bearing, and cooperating with said dihedral angles of revolution to resist the action of centrifugal forces acting upon the rollers and thereby assisting in maintaining the rollers against shifting in a direction longitudinally of the bearing, and also enabling the bearing to take end thrust exerted toward said conical end face.

3. In a bearing, the combination of a plurality of freely movable unconnected rollers, each of said rollers having its maximum diameter at an intermediate point on its length, and tapering on a conical taper toward each end from said intermediate point, the axes of said rollers disposed at an angle to the axis of the bearing, an inner bearing member having two conical faces, the elements of one of said conical faces forming a dihedral angle of revolution about the axis of the bearing, to fit the sides of said rollers, and an outer annular bearing member, having conical faces forming a dihedral angle of revolution about the axis of the bearing to fit against the rollers on their outer sides, the ends of said rollers that are farther from the axis of the bearing being capable of projecting beyond the periphery of the inner bearing member, and having removed portions leaving relief faces capable of lying within the said periphery of the inner bearing member, thereby enabling the outer bearing member to be shifted longitudinally into alignment with the inner bearing member, said rollers operating after the bearing members have been rotated relative to each other, to lock the outer bearing member against removal, said dihedral angles of revolution operating to maintain the alignment of said rollers.

4. In an enclosed self-locking cageless roller bearing, the combination of a plurality of freely movable unconnected rollers, each of said rollers having its maximum diameter at an intermediate point on its length, and tapering on a conical taper toward each end from said intermediate point, the axes of said rollers disposed at an angle to the axis of the bearing, an inner bearing member having two conical faces, the elements of the said conical faces forming a dihedral angle of revolution about the axis of the bearing, to fit the sides of said rollers, and an outer annular bearing member, having conical faces, the elements of one of said last-named conical faces forming a dihedral angle of revolution about the axis of the bearing, to fit against the rollers on their outer sides, said dihedral angles of revolution operating to maintain the alignment of said rollers, the ends of said rollers that are located farther from the axis of the bearing being capable of projecting beyond the periphery of the inner bearing member and having removed portions leaving relief faces so that all the rollers of the bearing are capable of being set in a position in which said relief faces lie within the periphery of the inner bearing, thereby enabling the outer bearing member to be shifted longitudinally of the bearing's axis, into alignment with the inner bearing member, all of said parts cooperating so that after a relative rotation of the two bearing members has taken place, some of the rollers will have portions of their outer ends projecting into the space beyond the periphery of the inner bearing member, thereby locking the bearing members against a relative shifting movement.

5. In an enclosed self-locking cageless roller bearing, the combination of a plurality of freely movable unconnected rollers, each of said rollers having its maximum diameter at an intermediate point on its length, and tapering on a conical taper toward each end from said intermediate point, the axes of said rollers disposed at an angle to the axis of the bearing, an inner bearing member having two conical faces, the elements of one of said conical faces forming a dihedral angle of revolution about the axis of the bearing, to fit the sides of said rollers, and an outer annular bearing member, having conical faces, the elements of one of said last-named conical faces forming a dihedral angle of revolution about the axis of the bearing, to fit against the rollers on their outer sides, said dihedral angles of revolution operating to maintain the alignment of said rollers, the ends of said rollers that are farther from the axis of the bearing being capable of projecting beyond the periphery of the inner bearing member and being cut away on their peripheries to a gradually increasing depth from an intermediate point on the roller to the end thereof, with the greatest depth of the cut-away portion located at the outer end of the rollers, thereby forming relief faces on the rollers depressed below the normal periphery of the rollers and enabling the bearing parts to be assembled by setting all the rollers in their aligned position on the inner bearing member with the cut-away portions disposed outwardly on the bearing to provide clearance for the outer bearing member when shifted longitudinally of the inner bearing member into alignment with the same, said rollers operating after a relative rotation of the bearing members has occurred, to project out into the outer bearing member and prevent the occurrence of a relative longitudinal shift of the bearing members.

OLLIE L. DIRRIG.